(12) United States Patent
Rasanen

(10) Patent No.: US 10,819,828 B2
(45) Date of Patent: Oct. 27, 2020

(54) ENHANCEMENT OF TRAFFIC DETECTION AND ROUTING IN VIRTUALIZED ENVIRONMENT

(71) Applicant: NOKIA SOLUTIONS AND NETWORKS OY, Espoo (FI)

(72) Inventor: John Juha Antero Rasanen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 26 days.

(21) Appl. No.: 16/338,171

(22) PCT Filed: Sep. 29, 2016

(86) PCT No.: PCT/EP2016/073184
§ 371 (c)(1),
(2) Date: Mar. 29, 2019

(87) PCT Pub. No.: WO2018/059682
PCT Pub. Date: Apr. 5, 2018

(65) Prior Publication Data
US 2020/0028938 A1 Jan. 23, 2020

(51) Int. Cl.
*H04L 29/08* (2006.01)
*H04W 40/30* (2009.01)
(Continued)

(52) U.S. Cl.
CPC ...... *H04L 67/327* (2013.01); *H04L 29/08135* (2013.01); *H04L 29/08459* (2013.01);
(Continued)

(58) Field of Classification Search
CPC ......... H04L 29/08135; H04L 29/0845–08459; H04L 29/08576; H04L 41/00;
(Continued)

(56) References Cited

U.S. PATENT DOCUMENTS 7,782,793 B2 * 8/2010 Olesinski ............ H04L 41/0893
370/253
8,503,307 B2 * 8/2013 Tourrilhes ........... H04L 41/0816
370/230

(Continued)

OTHER PUBLICATIONS

Y. Hu, M. Patel, D. Sabella, N. Sprecher, and V. Young, "Mobile edge computing: A key technology towards 5G," ETSI, Sophia Antipolis, France, White Paper 11, 2015.*

*Primary Examiner* — Brendan Y Higa
(74) *Attorney, Agent, or Firm* — Squire Patton Boggs (US) LLP

(57) ABSTRACT

The present invention provides apparatuses, methods, computer programs, computer program products and computer-readable media regarding enhancement of traffic detection and routing in virtualized environment. The method comprises receiving information regarding an installation of an application to a server, the information comprising a detection pattern used for detecting a data flow to be routed via the application to be installed, establishing a routing rule based on the detection pattern, and sending the routing rule to the server into which the application is to be installed.

17 Claims, 7 Drawing Sheets

(51) Int. Cl.

| | |
|---|---|
| *H04L 12/851* | (2013.01) |
| *H04W 28/02* | (2009.01) |
| *H04L 12/721* | (2013.01) |
| *H04L 12/771* | (2013.01) |
| *H04L 12/859* | (2013.01) |
| *H04W 28/10* | (2009.01) |
| *H04L 12/24* | (2006.01) |
| *H04L 12/725* | (2013.01) |
| *H04L 12/927* | (2013.01) |
| *H04L 12/715* | (2013.01) |

(52) U.S. Cl.
CPC ............ *H04L 41/082* (2013.01); *H04L 45/30* (2013.01); *H04L 45/38* (2013.01); *H04L 45/563* (2013.01); *H04L 45/64* (2013.01); *H04L 47/24* (2013.01); *H04L 47/2441* (2013.01); *H04L 47/2475* (2013.01); *H04L 47/803* (2013.01); *H04L 67/10* (2013.01); *H04W 28/02* (2013.01); *H04W 28/10* (2013.01); *H04W 40/30* (2013.01)

(58) Field of Classification Search
CPC ............... H04L 41/0813; H04L 41/082; H04L 41/0823; H04L 41/50–5025; H04L 45/30–563; H04L 47/10; H04L 47/20; H04L 47/24–2491; H04L 63/0218; H04L 65/80; H04L 67/10; H04L 67/30–322; H04L 67/327; H04W 28/02; H04W 28/0263–0273; H04W 28/10–26; H04W 40/30; H04W 64/00–006; G06F 9/45533; G06F 2009/45562–45595
See application file for complete search history.

(56) References Cited

U.S. PATENT DOCUMENTS

| | | | | |
|---|---|---|---|---|
| 2009/0279430 | A1* | 11/2009 | Huber | H04W 72/1226 370/230.1 |
| 2011/0022722 | A1* | 1/2011 | Castellanos Zamora | H04L 41/00 709/235 |
| 2015/0281120 | A1* | 10/2015 | Sindhu | H04L 47/10 709/226 |
| 2016/0127564 | A1* | 5/2016 | Sharma | H04W 4/24 455/406 |
| 2017/0104609 | A1* | 4/2017 | McNamee | H04M 15/61 |
| 2018/0351824 | A1* | 12/2018 | Giust | H04L 67/10 |

* cited by examiner

ENHANCEMENT OF TRAFFIC DETECTION AND ROUTING IN VIRTUALIZED ENVIRONMENT

FIELD OF THE INVENTION

The present invention relates to apparatuses, methods, systems, computer programs, computer program products and computer-readable media regarding enhancement of traffic detection and routing in virtualized environment.

Abbreviations and Definitions (Cf. For Example, Documents [1] and [3])

3GPP 3$^{rd}$ generation partnership project
5G 5$^{th}$ generation
API Application programming interface
CN Core network
DB Database
eNB Evolved Node B, E-UTRAN Node B
EPC Evolved packet core
ETSI European telecommunications standards institute
FPGA Field programmable gate array
GW Gateway
GS Group Specification
HW Hardware
ID Identity, Identifier
IP Internet protocol
ISG Industry specification group
MANO Management and orchestration
ME Mobile edge
MEC Mobile edge computing
NFV Network function virtualization
PCRF Policy and charging rules function
P-GW Packet data network gateway
RNIS Radio network information service
SDO Standards Development Organization
SW Software
UE User equipment
VNF Virtualized network function

BACKGROUND OF THE INVENTION

The European Telecommunications Standards Institute Industry Specification Group Mobile Edge Computing (ETSI ISG MEC) is standardizing a mobile edge computing environment (cf. documents [2] and [3]).

FIG. 1 is a block diagram illustrating an example of the essential parts of the MEC architecture, with several MEC servers 11, to which certain aspects of the present invention are applicable. The architecture comprises an UE 10 and several MEC servers 11, which are connected to eNBs 12, respectively. Further, the MEC servers 11 are connected to Management and Orchestration (MANO) 13 and a core network gateway (CN GW) 14. Each MEC server comprises at least one application 15, a Mobile Edge (ME) Platform 16 and a Data/Forwarding plane 17.

A UE 10 may use applications running on a MEC server 11. There are two different ways for a UE to use a MEC application:

(1) the application is an end application, i.e. the application session runs between the UE 10 and MEC server 11, and
(2) the end application, or counterpart to the UE, resides somewhere else out of the MEC server and the MEC application is an intermediate application that manipulates the user data flow(s), e.g. boosts or optimizes or adapts the content of a flow. The data/forwarding plane of a MEC server routes the data flows of a user/UE session to the correct application, and after handling by the application, further towards the UE or core network in case the MEC application is just an intermediate flow manipulator.

ETSI ISG MEC has recently approved three new work items regarding the UE application interface (cf. document [4]), the management interface (cf. document [5]), and the deployment of mobile edge computing in an NFV environment (cf. document [6]).

UE Application Interface:

This work item specifies the Mx2 reference point. This includes requesting application instantiation, discovering applications or application instances running in the mobile edge system, triggering the relocation of applications in and out of the mobile edge system, and exchanging information regarding an ongoing application, such as getting information on application IP address change. It will describe the information flows, required information, and as applicable, will specify the necessary data model and data format. The document produced will be a Group Specification (GS) that contains normative parts.

Management Interfaces:

This work item focuses on the management of the mobile edge system, mobile edge servers and mobile edge platforms. This includes platform configuration, performance and fault management, application monitoring, remote service configuration and service control, information gathering regarding the platform features, available services, and available virtualized resources. It will describe the information flows, required information and operation, and as when applicable, will specify the necessary opendata data model, and data format and operation format. The document produced will be a Group Specification that contains normative parts.

Deployment of Mobile Edge Computing in an NFV Environment:

This work item focuses on defining solutions that allow deployment of MEC in an NFV environment. The work will be a study with the intent to describe such solutions, document their architectural impacts, and conclude on the necessary normative work to enable one or more selected solutions, including potential changes to the MEC architecture. It will also decide where this normative work needs to be done, e.g. MEC Architecture GS, MEC interfaces GSs, in a new normative MEC GS or in specifications of other Standards Development Organizations (SDOs), as applicable. If applicable, ETSI ISG MEC will initiate collaboration with ETSI ISG NFV and potentially other SDOs, to perform the required modifications to their respective specifications. The document produced will be an informative GS.

However, it has not yet been specified how the data/forwarding plane is supposed to know which data flows are to be routed to which MEC application, especially when the MEC application is supposed to be an intermediate data flow manipulator between a UE and external application or party.

Currently, there has been defined a routing functionality by 3GPP for the core network gateway (P-GW), CN GW in FIG. 1. P-GW may get a routing rule from a policy controller (PCRF, Policy and Charging Rules Function). A routing rule contains the IP address of the target (where to route to) and identifies the data flow to be routed by a five tuple (IP addresses, ports and protocol) or by an application ID. The application ID shall be known by both parties, i.e. PCRF and P-GW. Application IDs have not been standardized, the reason being that the standard would never be up-to-date due to new applications being introduced all the time. So this is typically configurable information by operators. This does not fit well into a dynamic and/or virtualized MEC environment, where new applications and/or application instances may be downloaded to MEC servers on the fly.

A further issue to be taken into account when defining the routing functionality for the MEC system is that the data/forwarding plane and mobile edge platform (which controls the data/forwarding plane over the Mp2 interface) may come from different vendors. Solving compliancy problems, e.g. application ID coding and different detection capabilities, between implementations from different vendors by the prior art means would increase the need for configurations, which does not fit well into a dynamic and/or virtualized MEC environment.

A further problem in the long run may be how to identify and detect data flows of applications that may benefit from using a given MEC application as an intermediate data flow manipulator or booster or optimizer. A third party may provide a MEC server with a content manipulator or booster application or optimizer application etc. And the application provider is probably the best to know which data flows using external applications can be handled by the MEC application and would benefit from the MEC application, and consequently, should be routed via the MEC application.

REFERENCES

[1]: ETSI GS MEC 001 "Mobile-Edge Computing; Terminology"
[3]: ETSI GS MEC 002 "Mobile-Edge Computing; Technical Requirements"
[4]: ETSI GS MEC 003 "Mobile-Edge Computing; Framework and reference architecture"
[5]: ETSI document MEC(16)000041r5
[6]: ETSI document MEC(15)000259r6
[7]: ETSI document MEC(16)000049r2

SUMMARY OF THE INVENTION

It is therefore an object of the present invention to overcome the above mentioned problems and to provide apparatuses, methods, systems, computer programs, computer program products and computer-readable media regarding enhancement of traffic detection and routing in virtualized environment.

According to an aspect of the present invention there is provided a method for use in a management entity of a virtualized network comprising:
  receiving information regarding an installation of an application to a server,
  the information comprising a detection pattern used for detecting a data flow to be routed via the application to be installed,
  establishing a routing rule based on the detection pattern, and
  sending the routing rule to the server into which the application is to be installed.

According to another aspect of the present invention there is provided a method for use in a server of a virtualized network comprising:
  receiving a routing rule associated with an application, the routing rule comprising a detection pattern used for detecting a data flow to be routed via the application and routing information to be used by the server for routing the detected data flow to or via the application,
  installing the detection pattern in a traffic detection entity of the server, and
  installing the routing information in a routing entity of the server.

According to another aspect of the present invention there is provided an apparatus for use in a management entity of a virtualized network comprising:
  at least one processor,
  and
  at least one memory for storing instructions to be executed by the processor, wherein
  the at least one memory and the instructions are configured to, with the at least one processor, cause the apparatus at least to perform:
  receiving information regarding an installation of an application to a server,
  the information comprising a detection pattern used for detecting a data flow to be routed via the application to be installed,
  establishing a routing rule based on the detection pattern, and
  sending the routing rule to the server into which the application is to be installed.

According to another aspect of the present invention there is provided an apparatus for use in a server of a virtualized network comprising:
  at least one processor,
  and
  at least one memory for storing instructions to be executed by the processor, wherein
  the at least one memory and the instructions are configured to, with the at least one processor, cause the apparatus at least to perform:
  receiving a routing rule associated with an application, the routing rule comprising a detection pattern used for detecting a data flow to be routed via the application and routing information to be used by the server for routing the detected data flow to or via the application,
  installing the detection pattern in a traffic detection entity of the server, and
  installing the routing information in a routing entity of the server.

According to another aspect of the present invention there is provided an apparatus comprising:
  means for receiving information regarding an installation of an application to a server,
  the information comprising a detection pattern used for detecting a data flow to be routed via the application to be installed,
  means for establishing a routing rule based on the detection pattern, and
  means for sending the routing rule to the server into which the application is to be installed.

According to another aspect of the present invention there is provided an apparatus comprising:
  means for receiving a routing rule associated with an application, the routing rule comprising a detection pattern used for detecting a data flow to be routed via the application and routing information to be used by the server for routing the detected data flow to or via the application,
  means for installing the detection pattern in a traffic detection entity of the server, and
  means for installing the routing information in a routing entity of the server.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which.

DETAILED DESCRIPTION

Figure 1:
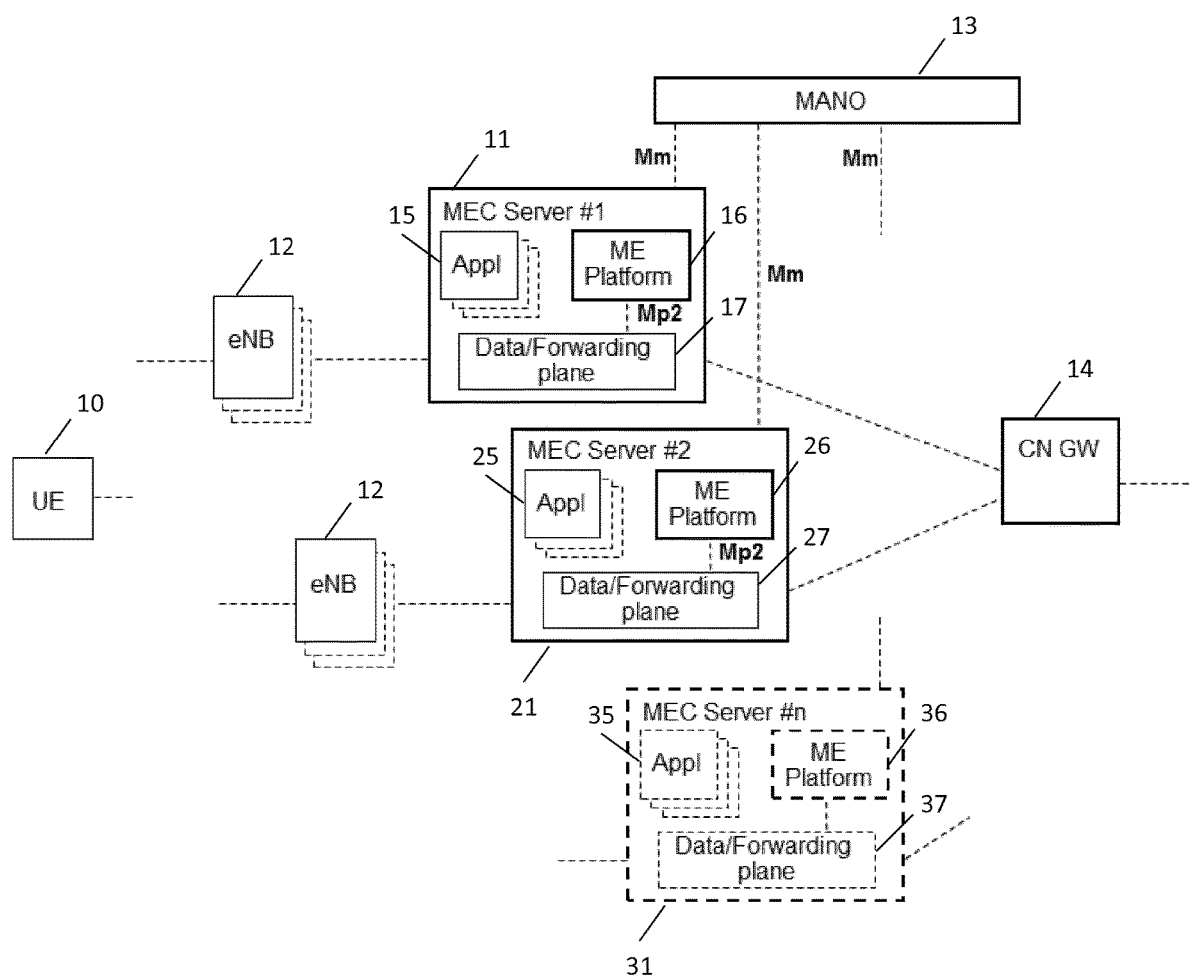
FIG. 1 is a block diagram illustrating an example of the essential parts of the MEC architecture to which certain aspects of the present invention are applicable.

In the following, some example versions of the disclosure and embodiments of the present invention are described with reference to the drawings. For illustrating the present invention, the examples and embodiments will be described in connection with a cellular communication network based on a 3GPP based communication system, for example an LTE/LTE-A based system. However, it is to be noted that the present invention is not limited to an application using such types of communication systems or communication networks, but is also applicable in other types of communication systems or communication networks, like for example 5G communication networks and the like.

The following example versions and embodiments are to be understood only as illustrative examples. Although the specification may refer to "an", "one", or "some" example version(s) or embodiment(s) or certain aspects in several locations, this does not necessarily mean that each such reference is to the same example version(s) or embodiment(s), or that the feature only applies to a single example version or embodiment. Single features of different embodiments may also be combined to provide other embodiments.

Furthermore, words "comprising" and "including" should be understood as not limiting the described embodiments to consist of only those features that have been mentioned and such example versions and embodiments may also contain features, structures, units, modules etc. that have not been specifically mentioned.

The basic system architecture of a communication network where examples of embodiments of the invention are applicable may comprise a commonly known architecture of one or more communication systems comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a radio network controller, besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage.

Furthermore, the described network elements and communication devices, such as terminal devices or user devices like UEs, communication network control elements of a cell, like a BS or an eNB, access network elements like APs and the like, network access control elements like AAA servers and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

The present invention relates to traffic detection and routing in virtualized environment, and particularly, relates to installing detection patterns for data flows associated with an application along with installation of the application to the MEC server.

In this regard, it is to be noted that any new application can bring application based, application developer generated detection information to the system, when introduced or instantiated. The system can then use the information when applying the detection and routing operations.

Without the aspects according to the present invention, such detection information shall be manually configured to the traffic detection function (which is about the current status). This, however, is not appropriate for the forthcoming MEC environment. MEC is a platform that invites applications from third parties. Manual configuration can be tolerated only in the temporary/initial phase, but not as a permanent solution in a mature system. Instantiation of new applications shall be as automated as possible.

Thus, according to certain aspects of the present invention, when a new application or application instance is provided for installation in the MEC system, the input information contains also downloadable detection pattern(s). The detection patterns are used for detecting application data flows that benefit from being routed via the (to-be-installed) MEC application.

A detection pattern, or patterns, may be provided e.g. in form of metadata or appendix with the application software (SW) file. Alternatively, the patterns may be created or modified separately, e.g. to meet the requirements of the operator.

A detection pattern may comprise several parts that shall be detected e.g. in a certain order or sequence to score a match. For example, the first part/step may comprise a pattern to detect the lower level protocol, the next part/step a pattern to detect the next or higher level protocol, the next part/step a pattern to detect a certain message of a/the protocol, the next part/step a pattern to detect a certain parameter with a certain value (e.g. a codec or game or informational application and its version).

A detection pattern, or detection patterns, may be combined with a mask or masks. A mask may e.g. help to align a detection pattern, or detection patterns, to search a match in the correct place of the data flow under detection.

When MANO prepares to install the application to a MEC server, MANO allocates routing information, e.g. an IP address or ID, to the application. MANO binds the routing information and the detection pattern(s) of the application together, into a routing rule. Upon installation, MANO sends the related routing rule(s) to the MEC server, e.g. to the Mobile Edge (ME) Platform or the Traffic Rules Control entity in it. The ME Platform (or the Traffic Rules Control entity in it) sends the routing rule(s) to the Data/Forwarding entity, which downloads the detection pattern(s) into the relevant traffic detection module (e.g. SW module or hardware (HW) module like e.g. FPGA (Field Programmable Gate Array)) and the routing part of the rule(s) into the relevant routing entity.

Alternatively, MANO may also send the routing rule(s) related to an application installed in a MEC server (#1) to another MEC server (#2). This enables routing relevant detected data flows from adjacent servers to a MEC server that supports the application.

The MEC server (or the ME Platform in it) may manipulate, e.g. deactivate or re-activate or restrict the use of, the received routing rules, e.g. due to radio network or MEC server related conditions.

After installation of routing rules, the data/forwarding layer of a MEC server is able to route any application data flow matching the detection pattern to or via the relevant MEC application identified in the routing rule.

When needed, e.g. when the related MEC application is deactivated or removed, MANO removes relevant routing rule(s) from the MEC server(s).

In the following, the above solution is described in some more detail with reference to FIGS. 2, 3 and 4.

It is to be noted that the MEC environment is used here only as an example. The suggested measures can be applied in other environments, too, e.g. virtualized and/or 5G environments, where traffic/application detection based routing is needed.

Figure 2:
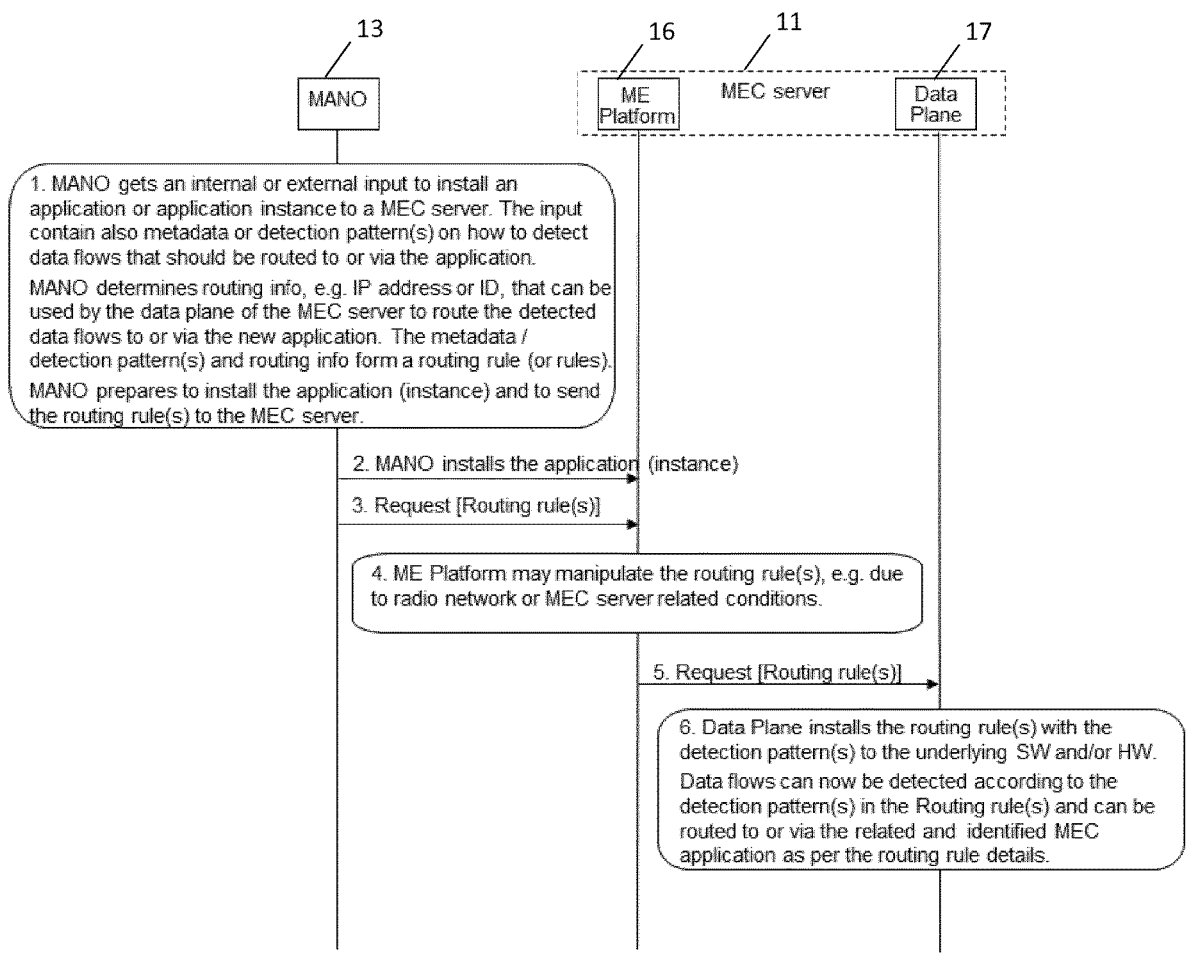
FIG. 2 is a diagram illustrating an example how the MANO gets a new application and related detection pattern(s), creates a routing rule (or rules), installs the application and sends the routing rule(s) to the MEC server, according to certain aspects of the present invention.

FIG. 2 is a diagram illustrating an example of how the MANO gets a new application and related detection pattern(s), creates a routing rule (or rules), installs the application and sends the routing rule(s) to the MEC server, according to certain aspects of the present invention.

FIG. 2 illustrates signaling between the MANO 13 and the MEC server 11 including the ME Platform 26 and the Data plane 27.

In a first step 1, the MANO 13 gets an internal or external input to install an application or application instance to a MEC server 11. The input contains also metadata or detection pattern(s) on how to detect data flows that should be routed to or via the application. The MANO 13 determines routing information, e.g. IP address or ID, that can be used by the data plane of the MEC server 11 to route the detected data flows to or via the new application. The metadata/detection pattern(s) and routing information form a routing rule (or rules). Then the MANO 13 prepares to install the application (instance) and to send the routing rule(s) to the MEC server 11.

In a step 2, the MANO 13 installs the application (instance) to the ME Platform 16 of the MEC server 11, and in step 3, the MANO 13 sends the routing rule(s) to the ME Platform 16 of the MEC server 11.

In a step 4, the MEC server (or the ME Platform in it) may manipulate, e.g. deactivate or re-activate or restrict the use of, the received routing rules, e.g. due to radio network or MEC server related conditions.

Then, in step 5, the rule(s) are forwarded to the data/forwarding plane 17 of the MEC server 11, and in step 6, the Data plane installs the routing rule(s) with the detection pattern(s) to the underlying SW and/or HW.

Thus, data flows can now be detected according to the detection pattern(s) in the routing rule(s) and can be routed to or via the related and identified MEC application as per the routing rule details.

Figure 3:
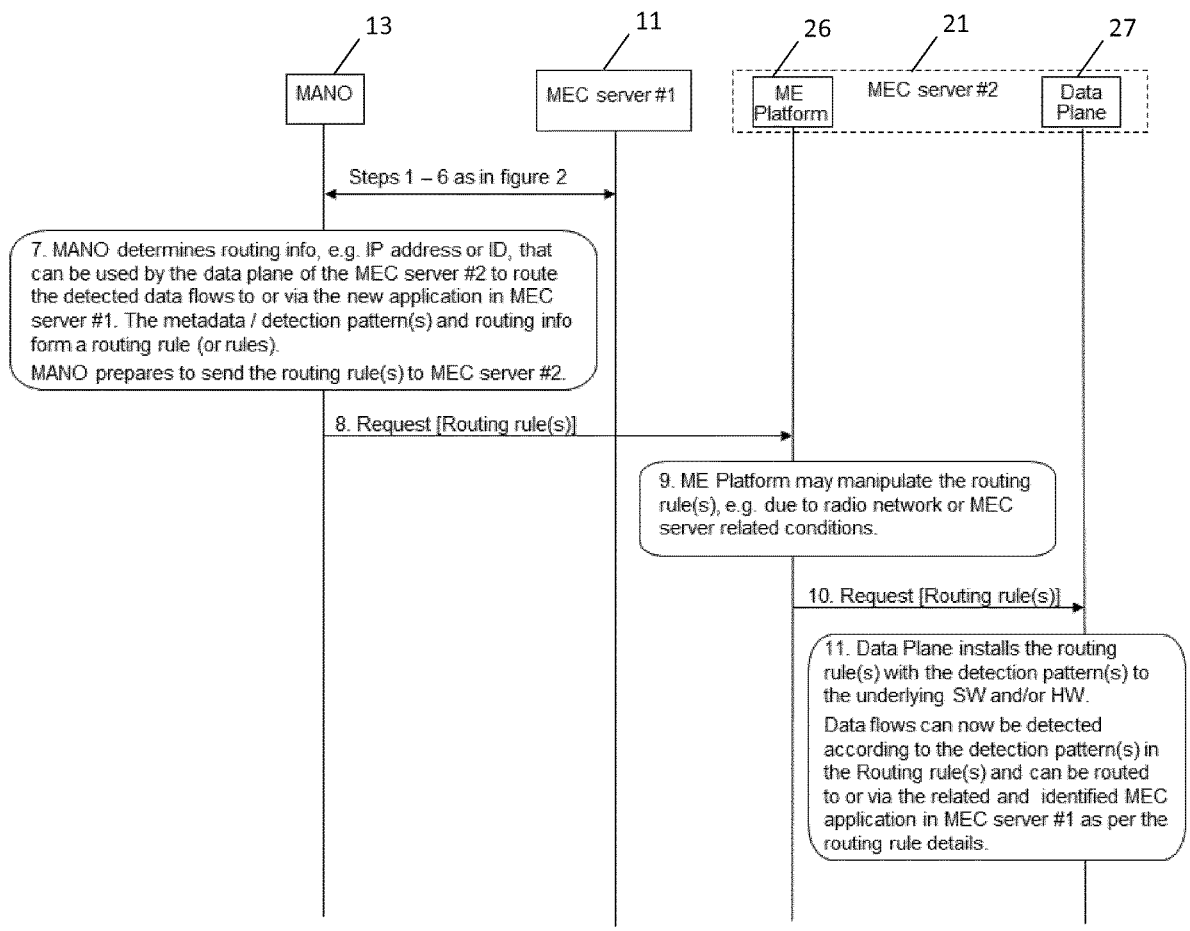
FIG. 3 is another diagram illustrating an example in which the MANO creates and installs routing rules with detection pattern(s) related to an application on a different server, according to certain aspects of the present invention.

FIG. 3 shows another diagram illustrating an example in which the MANO creates and installs routing rules with detection pattern(s) related to an application on a different server, according to certain aspects of the present invention.

In FIG. 3, steps 1 to 6 are the same as steps 1 to 6 in FIG. 2 and thus, a description thereof is omitted here.

In step 7, the MANO 13 determines routing information, e.g. IP address or ID, that can be used by the data plane of the MEC server #2, denoted by reference sign 21, to route the detected data flows to or via the new application in MEC server #1, denoted by reference sign 11. The metadata/detection pattern(s) and routing information form a routing rule (or rules) and the MANO 13 prepares to send the routing rule(s) to the MEC server #2.

In step 8, the MANO sends the routing rule(s) to the ME Platform 26 of the MEC server #2, and in step 9, the ME Platform 26 of the MEC server #2 may manipulate, e.g. deactivate or re-activate or restrict the use of, the received routing rule(s), e.g. due to radio network or MEC server related conditions.

Then, in step 10, the routing rule(s) are forwarded to the data/forwarding plane 27 of the MEC server #2 21, and in step 11, the Data plane installs the routing rule(s) with the detection pattern(s) to the underlying SW and/or HW.

Thus, data flows can now be detected according to the detection pattern(s) in the routing rule(s) and can be routed to or via the related and identified MEC application in MEC server #1 as per the routing rule details.

Figure 4:
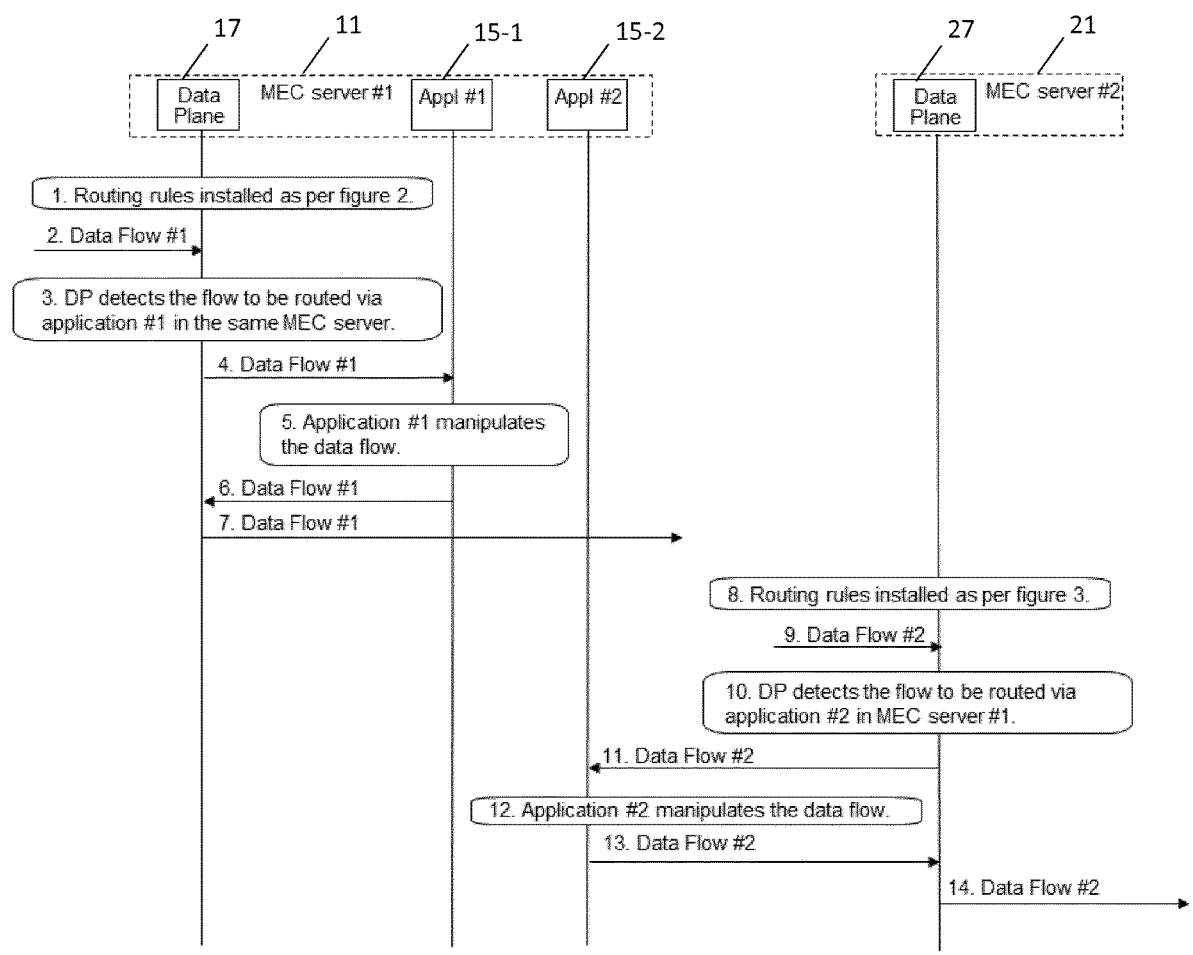
FIG. 4 is another diagram illustrating an example in which the MEC servers apply detection patterns to flows and route the flows via relevant applications, according to certain aspects of the present invention.

FIG. 4 shows another diagram illustrating an example in which the MEC servers apply detection patterns to flows and route the flows via relevant applications, according to certain aspects of the present invention.

In step 1 of FIG. 4, it is assumed that the routing rules are installed according to the procedure as shown in FIG. 2.

Then, in step 2, a first data flow #1 is received by the Data Plane 17 of the MEC server #1, denoted by reference sign 11. In step 3, the Data Plane detects the flow to be routed via application #1, denoted by reference sign 15-1, in the same MEC server #1.

Thus, in step 4, the Data Plane 17 forwards the data flow #1 to the application #1 of the MEC server #1. Then, application #1 manipulates the received data flow in step 5 and returns the data flow #1 to the Data Plane 17 of the MEC server #1 in step 6.

Then, in step 7, the data flow #1 is forwarded to the respective entity.

In step 8 of FIG. 4, it is assumed that the routing rules are installed according to the procedure as shown in FIG. 3.

Then, in step 9, a second data flow #2 is received by the Data Plane 27 of the MEC server #2, denoted by reference sign 21. In step 10, the Data Plane 27 detects the flow to be routed via application #2, denoted by reference sign 15-2, in the MEC server #1.

Thus, in step 11, the Data Plane 27 forwards the data flow #2 to the application #2 of the MEC server #1. Then, application #2 manipulates the received data flow in step 12 and returns the data flow #2 to the Data Plane 27 of the MEC server #2 in step 13.

Then, in step 14, the data flow #1 is forwarded to the respective entity.

The above described solution according to certain aspects of the present invention comprises a number of measures and steps which may be standardized and/or implemented in various combinations.

Thus, various combinations of the above mentioned steps are possible.

Only as a non-limiting example, the probably most automated combination, and so probably the most beneficial for operators, would comprise the following:

An application file/installation template including in some form also the detection pattern information, and being automatically provided to MANO in conjunction with the application SW itself. (The less automated this phase is, the more the operator needs to configure issues.)

MANO creating the routing rules with the detection patterns and downloading the rules to relevant MEC servers, MANO being aware of the SW and HW capabilities of the MEC servers, i.e. whether they support/are able to use such information.

Data/Forwarding plane (of a MEC server) supporting the reception and use of the detection pattern information and related routing information. The detection part at its best/fastest being based on programmable acceleration HW, like e.g. FPGA.

The protocol between the ME Platform and Data/Forwarding Plane (Mp2 interface) can be any, now available or new, simple protocol or API. The routing rules with the detection patterns can anyway be transferred transparently, in an information element or container, through the (Mp2) interface.

In view of the above, the proposed solution according to certain aspects of the present invention enables the automated use of detection pattern provided by the 3rd party/vendor of the application via/to which the detected data flows should be routed.

The prior art/earlier solution(s) can support the functionality only through semi-permanent configurations made by the operator of the MEC system, which is hopelessly awkward as a long term solution.

The prior art/earlier solution (for the core network gateway by 3GPP) is problematic in the dynamic and/or virtualized and multivendor MEC environment, as described above.

As already set out above, although the present invention has been described in connection with MEC as a specific example, the suggested measures can be applied in other environments, too, e.g. virtualized and/or 5G environments, where traffic/application detection based routing is needed.

In the following, a more general description of example versions of the present invention is made with respect to FIGS. 5 to 7.

Figure 5:
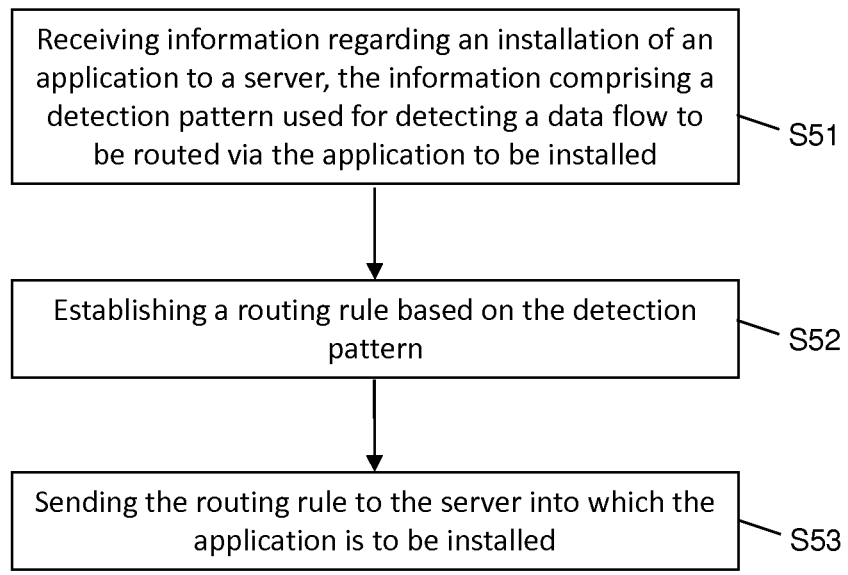
FIG. 5 is a flowchart illustrating an example of a method according to certain aspects of the present invention.

FIG. 5 is a flowchart illustrating an example of a method according to some example versions of the present invention.

According to example versions of the present invention, the method may be implemented in or may be part of a management entity, like for example, management and orchestration (MANO) or the like. The method comprises receiving information regarding an installation of an application to a server in step S51, the information comprising a detection pattern used for detecting a data flow to be routed via the application to be installed, establishing a routing rule based on the detection pattern in step S52, and sending the routing rule to the server into which the application is to be installed in step S53.

According to some example versions of the present invention, establishing the routing rule includes determining routing information to be used by the server for routing the detected data flow to or via the application to be installed, and constructing the routing rule by associating the routing information and the detection pattern.

According to some example versions of the present invention, the method further comprises determining another routing information to be used by another server for routing the detected data flow to or via the application to be installed, and constructing another routing rule by associating the other routing information and the detection pattern, and sending the other routing rule to the other server.

Figure 6:
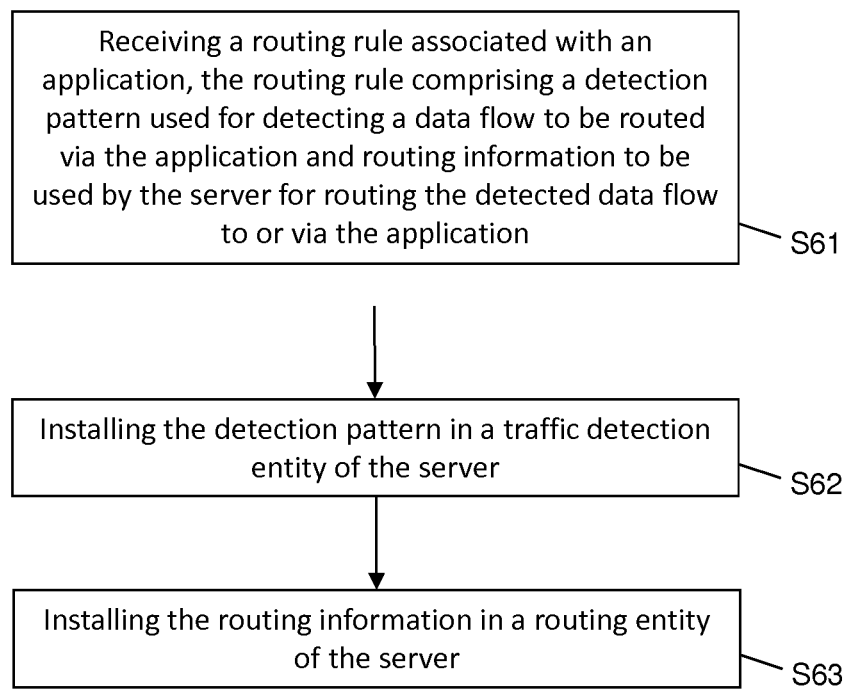
FIG. 6 is a flowchart illustrating another example of a method according to certain aspects of the present invention.

FIG. 6 is a flowchart illustrating another example of a method according to example versions of the present invention.

According to example versions of the present invention, the method may be implemented in a server of a virtualized network, like a MEC server or the like. The method comprises receiving a routing rule associated with an application in step S61, the routing rule comprising a detection pattern used for detecting a data flow to be routed via the application and routing information to be used by the server for routing the detected data flow to or via the application, installing the detection pattern in a traffic detection entity of the server in step S62, and installing the routing information in a routing entity of the server in step S63.

According to some example versions of the present invention, the application is installed in the server, or the application is installed in another server of the network.

According to some example versions of the present invention, the method further comprises manipulating the routing rules due to network or server related conditions.

According to some example versions of the present invention, the method further comprises detecting a data flow matching the detection pattern, and routing the data flow matching the detection pattern to or via the application associated with the routing rule.

According to some example versions of the present invention, the detection pattern is provided in form of metadata or an appendix to the software of the application to be installed.

According to some example versions of the present invention, the detection pattern comprises several parts to be detected in a specific order.

According to some example versions of the present invention, the detection pattern is combined with a mask for aligning the detection pattern.

Figure 7:
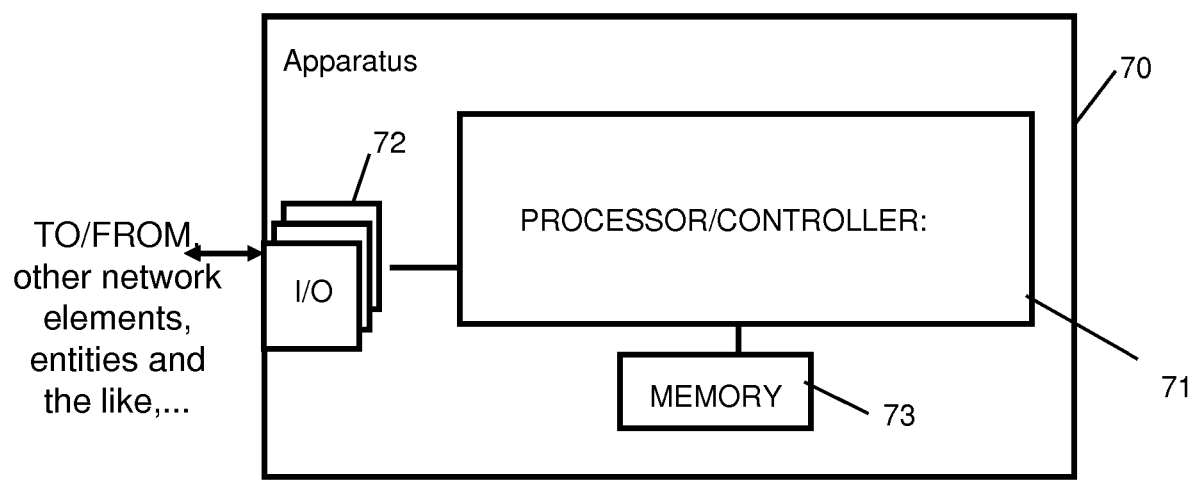
FIG. 7 is block diagram illustrating an example of an apparatus according to certain aspects of the present invention.

FIG. 7 is a block diagram illustrating an example of an apparatus according to some example versions of the present invention.

In FIG. 7, a block circuit diagram illustrating a configuration of an apparatus 70 is shown, which is configured to implement the above described aspects of the invention. It is to be noted that the apparatus 70 shown in FIG. 7 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 70 may comprise a processing function or processor 71, such as a CPU or the like, which executes instructions given by programs or the like. The processor 71 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 72 denotes transceiver or input/output (I/O) units (interfaces) connected to the processor 71. The I/O units 72 may be used for communicating with one or more other network elements, entities, terminals or the like. The I/O units 72 may be a combined unit comprising communication equipment towards several network elements, or may comprise a distributed structure with a plurality of different interfaces for different network elements. The apparatus 70 further comprises at least one memory 73 usable, for example, for storing data and programs to be executed by the processor 71 and/or as a working storage of the processor 71.

The processor 71 is configured to execute processing related to the above described aspects.

In particular, the apparatus 70 may be implemented in or may be part of a management entity, like for example, management and orchestration (MANO) or the like, and may be configured to perform a method as described in connection with FIG. 5. Thus, the processor 71 is configured to perform receiving information regarding an installation of an application to a server, the information comprising a detection pattern used for detecting a data flow to be routed via the application to be installed, establishing a routing rule based on the detection pattern, and sending the routing rule to the server into which the application is to be installed.

Further, the apparatus 70 may be implemented in a server of a virtualized network, like a MEC server or the like, and may be configured to perform a method as described in connection with FIG. 6. Thus, the processor 71 is configured to perform receiving a routing rule associated with an application, the routing rule comprising a detection pattern used for detecting a data flow to be routed via the application and routing information to be used by the server for routing the detected data flow to or via the application, installing the detection pattern in a traffic detection entity of the server, and installing the routing information in a routing entity of the server.

For further details regarding the functions of the apparatus 70, reference is made to the description of the methods according to some example versions of the present invention as described in connection with FIGS. 5 and 6.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that
  method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is to be noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method for use in a management entity of a virtualized network, comprising:
    receiving information regarding an installation of an application to a server;
    the information comprising a detection pattern used for detecting a data flow to be routed via the application to be installed;
    establishing a routing rule based on the detection pattern; and
    sending the routing rule to the server into which the application is to be installed.

2. The method according to claim 1, wherein establishing the routing rule includes:
    determining routing information to be used by the server for routing the detected data flow to or via the application to be installed; and
    constructing the routing rule by associating the routing information and the detection pattern.

3. The method according to claim 1, further comprising:
    determining another routing information to be used by another server for routing the detected data flow to or via the application to be installed; and
    constructing another routing rule by associating the other routing information and the detection pattern; and
    sending the other routing rule to the other server.

4. The method according to claim 1, wherein
    the detection pattern is provided in form of metadata or an appendix to the software of the application to be installed.

5. A method for use in a server of a virtualized network, the method comprising:
    receiving a routing rule associated with an application, the routing rule comprising a detection pattern used for detecting a data flow to be routed via the application and routing information to be used by the server for routing the detected data flow to or via the application;
    installing the detection pattern in a traffic detection entity of the server; and
    installing the routing information in a routing entity of the server.

6. The method according to claim 5, wherein
    the application is installed in the server, or
    the application is installed in another server of the network.

7. The method according to claim 5, further comprising:
    manipulating the routing rules due to network or server related conditions.

8. The method according to claim 5, further comprising:
    detecting a data flow matching the detection pattern; and
    routing the data flow matching the detection pattern to or via the application associated with the routing rule.

9. An apparatus for use in a management entity of a virtualized network, the apparatus comprising:
    at least one processor;
    and
    at least one memory for storing instructions to be executed by the processor, wherein the at least one memory and the instructions are configured to, with the at least one processor, cause the apparatus at least to perform:
  receiving information regarding an installation of an application to a server;
  the information comprising a detection pattern used for detecting a data flow to be routed via the application to be installed;
  establishing a routing rule based on the detection pattern; and
  sending the routing rule to the server into which the application is to be installed.

10. The apparatus according to claim 9, wherein, in establishing the routing rule, the at least one memory and the instructions are further configured to, with the at least one processor, cause the apparatus at least to perform:
  determining routing information to be used by the server for routing the detected data flow to or via the application to be installed; and
  constructing the routing rule by associating the routing information and the detection pattern.

11. The apparatus according to claim 9, wherein the at least one memory and the instructions are further configured to, with the at least one processor, cause the apparatus at least to perform:
  determining another routing information to be used by another server for routing the detected data flow to or via the application to be installed; and
  constructing another routing rule by associating the other routing information and the detection pattern; and
  sending the other routing rule to the other server.

12. The apparatus according to claim 9, wherein
  the detection pattern is provided in form of metadata or an appendix to the software of the application to be installed.

13. An apparatus for use in a server of a virtualized network, the apparatus comprising:
  at least one processor;
  and
  at least one memory for storing instructions to be executed by the processor, wherein
  the at least one memory and the instructions are configured to, with the at least one processor, cause the apparatus at least to perform:
  receiving a routing rule associated with an application, the routing rule comprising a detection pattern used for detecting a data flow to be routed via the application and routing information to be used by the server for routing the detected data flow to or via the application;
  installing the detection pattern in a traffic detection entity of the server; and
  installing the routing information in a routing entity of the server.

14. The apparatus according to claim 13, wherein
  the application is installed in the server, or
  the application is installed in another server of the network.

15. The apparatus according to claim 13, wherein the at least one memory and the instructions are further configured to, with the at least one processor, cause the apparatus at least to perform:
  manipulating the routing rules due to network or server related conditions.

16. The apparatus according to claim 13, wherein the at least one memory and the instructions are further configured to, with the at least one processor, cause the apparatus at least to perform:
  detecting a data flow matching the detection pattern; and
  routing the data flow matching the detection pattern to or via the application associated with the routing rule.

17. A computer program product embodied on a non-transitory computer-readable medium, said computer program product including a program for a processing device, comprising software code portions for performing the method of claim 1, when the program is run on the processing device.

* * * * *